United States Patent
Lee et al.

(10) Patent No.: US 9,248,395 B2
(45) Date of Patent: Feb. 2, 2016

(54) ADSORBENT FOR CARBON DIOXIDE, METHOD OF PREPARING THE SAME, AND CAPTURE MODULE FOR CARBON DIOXIDE INCLUDING THE SAME

(71) Applicant: Samsung Electronics Co., Ltd., Suwon-Si, Gyeonggi-Do (KR)

(72) Inventors: Hyun Chul Lee, Hwaseong-si (KR); Jeong Gil Seo, Yongin-si (KR); Soon Chul Kwon, Hwaseong-si (KR); Hyuk Jae Kwon, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 18 days.

(21) Appl. No.: 13/837,036

(22) Filed: Mar. 15, 2013

(65) Prior Publication Data

US 2013/0247757 A1 Sep. 26, 2013

(30) Foreign Application Priority Data

Mar. 26, 2012 (KR) .................. 10-2012-0030802

(51) Int. Cl.
*B01D 53/02* (2006.01)
*B01J 20/04* (2006.01)
(Continued)

(52) U.S. Cl.
CPC .............. *B01D 53/02* (2013.01); *B01J 20/041* (2013.01); *B01J 20/06* (2013.01); *B01J 20/08* (2013.01); *B01J 20/103* (2013.01);
(Continued)

(58) Field of Classification Search
CPC .... B01D 53/02; B01D 53/04; B01D 2253/25; B01D 2253/1124; B01D 2253/304; B01D 2257/504; B01D 2258/0283; B01J 20/041; B01J 20/3078; B01J 20/06; B01J 20/08; B01J 20/103; Y02C 10/08
See application file for complete search history.

(56) References Cited

U.S. PATENT DOCUMENTS

| 5,648,508 A | 7/1997 | Yaghi |
| 6,125,655 A | 10/2000 | Millet et al. |

(Continued)

FOREIGN PATENT DOCUMENTS

| CN | 1993175 A | 7/2007 |
| CN | 101389400 A | 3/2009 |

(Continued)

OTHER PUBLICATIONS

Alvarez, et al., "High-surface-area mesoporous spinel from a double-alkoxide precursor" Journal of Materials Science Letters; 1993, vol. 12, No. 20, pp. 1619-1621.

(Continued)

*Primary Examiner* — Christopher P Jones
(74) *Attorney, Agent, or Firm* — Harness, Dickey & Pierce, P.L.C.

(57) ABSTRACT

An adsorbent for carbon dioxide may include a structure that includes composite metal oxide including a first metal ($M^1$) and a second metal ($M^2$) linked through oxygen (O). The first metal ($M^1$) may be selected from an alkali metal, an alkaline-earth metal, and a combination thereof. The second metal ($M^2$) may have a trivalent oxidation number or greater. The composite metal oxide may include mesopores inside or in the surface thereof. The adsorbent may be included in a capture module for carbon dioxide. A method of reducing emissions may include adsorbing carbon dioxide using the adsorbent for carbon dioxide.

23 Claims, 5 Drawing Sheets

(51) Int. Cl.
  *B01J 20/30* (2006.01)
  *B01J 20/06* (2006.01)
  *B01J 20/08* (2006.01)
  *B01J 20/10* (2006.01)
  *B01D 53/04* (2006.01)

(52) U.S. Cl.
  CPC ............ *B01J 20/3078* (2013.01); *B01D 53/04* (2013.01); *B01D 2253/1124* (2013.01); *B01D 2253/25* (2013.01); *B01D 2253/304* (2013.01); *B01D 2257/504* (2013.01); *B01D 2258/0283* (2013.01); *Y02C 10/08* (2013.01)

(56) References Cited

U.S. PATENT DOCUMENTS

| | | | |
|---|---|---|---|
| 6,280,503 | B1 | 8/2001 | Mayorga et al. |
| 7,442,232 | B2 | 10/2008 | White et al. |
| 7,621,980 | B2 | 11/2009 | Saito et al. |
| 2006/0037478 | A1 | 2/2006 | Mori et al. |
| 2007/0125229 | A1* | 6/2007 | Saito et al. ............... 95/139 |
| 2012/0068124 | A1* | 3/2012 | Dickinson et al. ............ 252/509 |

FOREIGN PATENT DOCUMENTS

| | | |
|---|---|---|
| CN | 101537339 A | 9/2009 |
| CN | 101696015 A | 4/2010 |
| EP | 0 110 490 | 6/1984 |
| EP | 0 990 621 | 4/2000 |
| JP | 10272336 A | 10/1998 |
| JP | 11077200 A | 3/1999 |
| JP | 2005262126 A | 9/2005 |
| KR | 20090120400 A | 11/2009 |

OTHER PUBLICATIONS

Hadian, et al., "$CO_2$ reforming of methane over nickel catalysts supported on nanocrystalline $MgAl_2O_4$ with high surface area", Journal of Natural Gas Chemistry, 2012, vol. 21, No. 2, pp. 200-206.

Li, et al., "$MgAl_2O_4$ Spinel-Stabilized Calcium Oxide Absorbents with Improved Durability for High-Temperature $CO_2$ Capture", Energy & Fuels, 2010, vol. 24, No. 6, pp. 3698-3703.

Extended European Search Report, dated Jul. 15, 2013, issued in European Application No. 13160900.0.

Chinese Office Action dated Sep. 6, 2015 issued in corresponding Chinese Application No. 201310098690.4 (English translation provided).

* cited by examiner

ADSORBENT FOR CARBON DIOXIDE, METHOD OF PREPARING THE SAME, AND CAPTURE MODULE FOR CARBON DIOXIDE INCLUDING THE SAME

CROSS-REFERENCE TO RELATED APPLICATION

This application claims priority under 35 U.S.C. §119 to Korean Application No. 10-2012-0030802, filed in the Korean Intellectual Property Office on Mar. 26, 2012, the entire contents of which are incorporated herein by reference.

BACKGROUND

1. Field

The present disclosure relates to an adsorbent for carbon dioxide, a method of preparing the same, and a capture module for carbon dioxide including the same.

2. Description of the Related Art

As fossil fuels are increasingly used, more carbon dioxide (which is believed to have a relatively serious influence on global warming) is being emitted into the air. Accordingly, research has been undertaken on the removal of carbon dioxide from the flue gas generated when fossil fuels are combusted, the syngas generated when coal is gasified, and the fuel gas generated when natural gas is reformed.

The removal of carbon dioxide from flue gas may be performed in an absorption method (e.g., a wet chemical absorption method, a dry chemical absorption method), an adsorption method, a membrane separation method, and the like. However, in order to capture a relatively large amount of carbon dioxide from flue gas, an adsorbent having improved adsorption performance is required.

In general, an adsorbent may be classified as an adsorbent for a lower temperature (0° C. to room temperature) such as MOF (metal organic framework)/ZIF (zeolitic-imidazolate framework), zeolite, carbon, and the like, an adsorbent for a middle temperature (about 150 to about 400° C.) such as hydrotalcite and the like, and an adsorbent for a higher temperature (greater than or equal to about 500° C.). However, these adsorbents may involve more complex processes and additional costs, since flue gas discharged after combustion should be cooled.

SUMMARY

Some example embodiments relate to an adsorbent for carbon dioxide, which has improved adsorption performance and thermal stability and works at a higher temperature.

Some example embodiments relate to a method of preparing the adsorbent for carbon dioxide.

Some example embodiments relate to a capture module for carbon dioxide including the adsorbent for carbon dioxide.

Some example embodiments relate to a method of adsorbing carbon dioxide using the adsorbent for carbon dioxide.

An adsorbent for carbon dioxide may include a structure that includes a composite metal oxide including a first metal ($M^1$) and a second metal ($M^2$) linked through oxygen (O), wherein the first metal ($M^1$) is selected from an alkali metal, an alkaline-earth metal, and a combination thereof, and the second metal ($M^2$) has a trivalent oxidation number or greater, and the composite metal oxide includes mesopores inside or on the surface thereof.

The composite metal oxide may have a spinel structure. The composite metal oxide may be a crystalline oxide.

The mesopores may have an average pore size of about 2 nm to about 50 nm.

The composite metal oxide may have an average particle size of about 0.01 μm to about 10 μm.

The composite metal oxide may be represented by the following Chemical Formula 1.

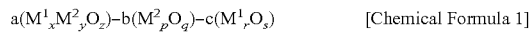  [Chemical Formula 1]

In Chemical Formula 1, $M^1$ is a first metal selected from a monovalent alkali metal, a divalent alkaline-earth metal, and a combination thereof, $M^2$ is a second metal having a trivalent oxidation number or greater, $0<x\leq 1$, $0<y\leq 2$, $0<z\leq 4$, $0<p\leq 2$, $0<q\leq 3$, $0<r\leq 2$, $0<s\leq 1$, $0<a\leq 1$, $0\leq b\leq 199$, $0\leq c\leq 9$, and $0<a+b+c$.

The alkali metal may be selected from lithium (Li), sodium (Na), potassium (K), rubidium (Rb), cesium (Cs) and a combination thereof, and the alkaline-earth metal may be selected from beryllium (Be), magnesium (Mg), calcium (Ca), strontium (Sr), barium (Ba), and a combination thereof.

The second metal ($M^2$) having a trivalent oxidation number or greater may be selected from a Group 13 element of the IUPAC periodic table, a Group 14 element of the IUPAC periodic table, a transition element, and a combination thereof. In one embodiment, the second metal ($M^2$) may be selected from aluminum (Al), silicon (Si), titanium (Ti), zirconium (Zr), and a combination thereof.

The first metal ($M^1$) and the second metal ($M^2$) may be present at an atomic ratio ($M^1/M^2$) of about 0.01/1 to about 5/1, specifically about 0.1/1 to about 3/1, and more specifically about 1/1 to about 3/1.

The adsorbent for carbon dioxide may further include an oxide of the first metal ($M^1$) (e.g., oxide of an alkali metal and/or an oxide of an alkaline-earth metal) adhered on the surface of the composite metal oxide.

The composite metal oxide may be selected from a silicate, an aluminate, a titanate, a zirconate, and a combination thereof. At least one of the second metal ($M^2$) selected from Si, Al, Ti, Zr, and a combination thereof present in the composite metal oxide is partially substituted with the first metal ($M^1$) selected from an alkali metal, an alkaline-earth metal, and a combination thereof.

The adsorbent for carbon dioxide may have a pore volume of about 0.01 to about 3.0 cm³/g and may have a specific surface area of about 10 to about 500 m²/g.

A method of preparing an adsorbent for carbon dioxide may include preparing a first mixture by adding a precursor of a second metal ($M^2$) having a trivalent oxidation number or greater to a polar solvent, adding water to the first mixture to prepare a partially hydrated mixture, preparing a second mixture by adding a precursor of a first metal ($M^1$) (wherein the first metal is selected from an alkali metal, an alkaline-earth metal, and a combination thereof) to the partially hydrated mixture, adding water to the second mixture to induce hydrolysis and produce a wet gel, and calcining the wet gel to provide a composite metal oxide having mesopores inside or on the surface thereof.

The first mixture may further include an acid or alkylene oxide to promote partial hydration.

The precursor of the second metal having the trivalent oxidation number or greater may be an alkoxide of the second metal having the trivalent oxidation number or greater or an inorganic salt of the second metal having the trivalent oxidation number or greater, and may be represented by the following Chemical Formula 2.

  [Chemical Formula 2]

In Chemical Formula 2, $M^2$ is a metal having a valence of greater than or equal to 3, $R^1$ and $R^2$ are the same or different and are each independently hydrogen, an acryloyl group, a methacryloyl group, a vinyl group, a C1 to C15 linear or branched alkoxy group, a halogen, or a nitrate group, provided that at least one of $R^1$ and $R^2$ is a C1 to C15 linear or branched alkoxy group, a halogen, or a nitrate group, n denotes a valence of $M^2$, and m is an integer in the range of about 0 to n.

The polar solvent may include water, alcohol, ether, and a combination thereof.

The precursor of the first metal ($M^1$) may be an alkoxide of the first metal ($M^1$) or an inorganic salt of the first metal ($M^1$). The alkoxide of the first metal ($M^1$) or the salt of the first metal ($M^1$) may be a compound including a cation of the first metal and an anion selected from an alkoxide anion ($OR^-$, wherein R is a C1 to C15 linear or branched alkyl group), a halide anion ($X^-$, wherein X is a halogen), a nitrate anion ($NO_3^-$), a carbonate anion ($CO_3^{-2}$), a sulfate anion ($SO_4^{-2}$), a sulfonate anion ($SO_3^-$), a phosphate anion ($PO_4^{-3}$), and an acetate anion ($CH_3COO^-$).

The calcining may be performed at a temperature of about 400° C. to about 800° C.

A capture module for carbon dioxide may include the adsorbent for carbon dioxide.

A method of capturing carbon dioxide may include adsorbing carbon dioxide using the adsorbent for carbon dioxide.

The method of adsorbing carbon dioxide may be performed at a middle temperature of about 200 to about 500° C. and/or at a higher temperature of greater than about 500° C.

DETAILED DESCRIPTION

Figure 1:
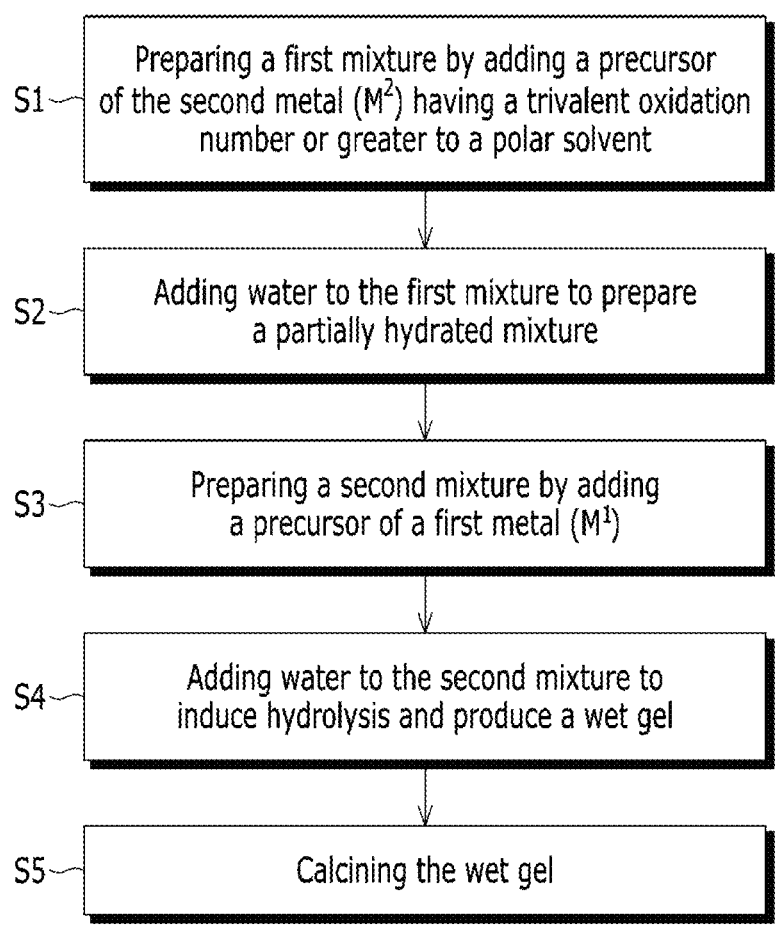
FIG. 1 is a flow chart showing a process of preparing an adsorbent for carbon dioxide according to one example embodiment.

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms, "comprises," "comprising," "includes," and/or "including," if used herein, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein.

As used herein, the term "combination thereof" may refer to a mixture, a stacked structure, a composite compound, an alloy, and the like.

As used herein, the term "metal" may refer to a metal having conductivity or a semi-metal having semiconducting properties.

An adsorbent for carbon dioxide may include a structure including a composite metal oxide. The composite metal oxide may include a first metal ($M^1$) and a second metal ($M^2$) linked through oxygen (O) so as to have a —$M^1$—O—$M^2$— framework. The first metal ($M^1$) may be selected from an alkali metal, an alkaline-earth metal, and a combination thereof, and the second metal ($M^2$) may have a trivalent oxidation number or greater. For example, the second metal ($M^2$) may have a valence of 3 or 4. The composite metal oxide may be mesoporous so as to include mesopores inside and/or on the surface thereof.

The mesopores may have an average pore size of about 2 nm to about 50 nm, and specifically about 5 nm to about 45 nm. The presence of mesopores having an average size within the above range may improve the active surface area and dispersion degree of an adsorption component in the adsorbent for carbon dioxide and increase efficiency of a material and heat transfer inside the adsorbent and consequently improve adsorption performance of the adsorbent for carbon dioxide. The composite metal oxide may have an average particle size of about 0.01 μm to about 10 μm, specifically about 0.05 μm to about 5 μm, and more specifically about 0.1 μm to about 1 μm. When the composite metal oxide has an average particle size within the above range, the mesopores may be formed with relative ease on the surface and in the inside thereof. This composite metal oxide having the mesopores includes few or no macropores and thus has improved mechanical strength and durability.

The composite metal oxide may be an oxide having a spinel structure. The spinel structure may be in the form of at least one of $AB_2O_4$, $A_2BO_4$, and $ABO_2$, wherein A and B are monovalent, divalent, trivalent, and/or tetravalent cations. A and B may be different elements or the same element but with different charges. In a non-limiting embodiment, the spinel structure may be in the form of $MgAl_2O_4$, $Mg_2SiO_4$, and $LiAlO_2$, although it should be understood that the present disclosure is not limited thereto. The composite metal oxide may also be represented by the following Chemical Formula 1.

$$a(M^1_xM^2_yO_z)\text{-}b(M^2_pO_q)\text{-}c(M^1_rO_s) \quad \text{[Chemical Formula 1]}$$

In Chemical Formula 1, $M^1$ is a first metal selected from a monovalent alkali metal, a divalent alkaline-earth metal, and a combination thereof, $M^2$ is a second metal having a trivalent oxidation number or greater, and specifically a trivalent to tetravalent oxidation number, $0<x\le1$, $0<y\le2$, $0<z\le4$, $0<p\le2$, $0<q\le3$, $0<r\le2$, $0<s\le1$, $0<a\le1$, $0\le b\le199$, and $0\le c\le9$. In one example embodiment, a may be greater than zero, b may be greater than zero, and/or c may be greater than zero. For instance, the sum of a, b, and c may be expressed as $0<a+b+c$. In another instance, b and c may also be in the following ranges: $0\le b\le10$, $0\le c\le5$.

The composite metal oxide represented by the above Chemical Formula 1 may be a solid solution including a first phase including a composite metal oxide $(M^1_xM^2_yO_z)$ in which $M^1$ is partially substituted for $M^2$, a second phase including an $M^2$ oxide $(M^2_pO_q)$, and a third phase including an $M^1$ oxide $(M^1_rO_s)$.

The second phase including a $M^2$ oxide $(M^2_pO_q)$ and the third phase including a $M^1$ oxide $(M^1_rO_s)$ may not exist according to an atomic ratio between $M^1$ and $M^2$.

The first metal $M^1$ is a basic alkali metal or alkaline-earth metal and may further improve adsorption performance for carbon dioxide. Accordingly, an adsorbent for carbon dioxide having a desired adsorption performance at a middle temperature and/or a higher temperature (about 200° C. to about 600° C.) depending on the first metal ($M^1$) is provided. For example, when the first metal ($M^1$) is Li or Ca, a composite metal oxide including these metals or oxides of these metals is produced, which may bring about an adsorbent for carbon dioxide having improved stability at a higher temperature.

The alkali metal may be selected from lithium (Li), sodium (Na), potassium (K), rubidium (Rb), cesium (Cs) and a combination thereof, and the alkaline-earth metal may be selected from beryllium (Be), magnesium (Mg), calcium (Ca), strontium (Sr), barium (Ba), and a combination thereof.

The second metal ($M^2$) having a trivalent oxidation number or greater may be selected from a Group 13 element of the IUPAC periodic table, a Group 14 element of the IUPAC periodic table, a transition element, and a combination thereof. In one embodiment, the second metal ($M^2$) may be selected from aluminum (Al), silicon (Si), titanium (Ti), zirconium (Zr), and a combination thereof.

The first metal ($M^1$) and the second metal ($M^2$) may be present at an atomic ratio ($M^1/M^2$) of about 0.01/1 to about 5/1, specifically about 0.1/1 to about 3/1, and more specifically about 1/1 to about 3/1. When the first metal ($M^1$) and the second metal ($M^2$) have an atomic ratio within the above range, an adsorbent for carbon dioxide may have further improved carbon dioxide adsorption performance and may provide a more structurally stable composite metal oxide.

The first metal ($M^1$) may be selected from an alkali metal and/or an alkaline-earth metal. An oxide of the alkali metal or an oxide of the alkaline-earth metal may be further adhered on the surface of the composite metal oxide. The oxide of the first metal ($M^1$) may be crystalline and nanosized. For example, the oxide of the first metal ($M^1$) may have a size ranging from about 2 nm to about 50 nm, and specifically about 5 nm to about 40 nm. The oxide of the first metal ($M^1$) may exist as an island on the surface of a composite metal oxide. The oxide of the first metal ($M^1$) is chemically combined with the composite metal oxide.

For example, the composite metal oxide may be selected from a silicate, an aluminate, a titanate, a zirconate, and a combination thereof. At least one of the second metal ($M^2$) selected from Si, Al, Ti, Zr, and a combination thereof present in the composite metal oxide is partially substituted with the first metal ($M^1$) selected from an alkali metal, an alkaline-earth metal, and a combination thereof.

The adsorbent for carbon dioxide may have a pore volume of about 0.01 to about 3.0 $cm^3/g$ and a specific surface area of about 10 to about 500 $m^2/g$. When the adsorbent for carbon dioxide has a pore volume or a specific surface area within the above ranges, the adsorbent may have further improved adsorption performance.

Hereinafter, a method of preparing the adsorbent for carbon dioxide is described referring to FIG. 1. First, a precursor of the second metal ($M^2$) having the trivalent oxidation number or greater (e.g., valence of 3-4) is added to a polar solvent to prepare a first mixture (S1).

The first mixture may further include an acid or alkylene oxide as a catalyst to promote partial hydration. The acid may be nitric acid, acetic acid, citric acid, and the like, but is not limited thereto. The alkylene oxide may be C1 to C10 alkylene oxide such as ethylene oxide, propylene oxide, butylene oxide, and the like. The acids are used as a catalyst, and are accordingly included in a catalyst amount, for example, in an amount of about 0.01 moles to about 10 moles based on 100 moles of the precursor of the second metal ($M^2$) precursor, but this is not limited thereto.

The precursor of the second metal ($M^2$) having the trivalent oxidation number or greater may be an alkoxide of the second metal ($M^2$) having the trivalent oxidation number or greater or an inorganic salt of the second metal ($M^2$) having the trivalent oxidation number or greater, and may be represented by the following Chemical Formula 2.

$$M^2(R^1)_m(R^2)_{n-m} \quad \text{[Chemical Formula 2]}$$

In Chemical Formula 2, $M^2$ is a metal having a valence of greater than or equal to 3, $R^1$ and $R^2$ are each independently hydrogen, an acryloyl group, a methacryloyl group, a vinyl group, a C1 to C15 linear or branched alkoxy group, a halogen, for example —Cl, —F, and the like, or a nitrate group, and at least one of $R^1$ and $R^2$ is a C1 to C15 linear or branched alkoxy group, a halogen, for example —Cl, —F, and the like, or a nitrate group, n is a valence of $M^2$, and m is an integer of 0 to n.

The alkoxy group may be a methoxy group, an ethoxy group, an n-propoxy group, an i-propoxy group, an n-butoxy group, an i-butoxy group, a t-butoxy group, and a combination thereof.

The polar solvent may include water, alcohol, ether, and a combination thereof. Examples of the alcohol may include methanol, ethanol, 2-propanol, and the like. In one embodiment, a C1 to C6 lower alcohol having miscibility with water may be desirable.

The polar solvent may be used in a state of being heated to about 20° C. to about 80° C.

Then, water is added to the first mixture, thereby preparing a partially-hydrated mixture (S2). At least one of $R^1$ and $R^2$ in the above Chemical Formula 2 is a C1 to C15 linear or branch alkoxy group, a halogen, or a nitrate group which undergoes partial hydrolysis and acts as a leaving group.

Then, the precursor of the first metal ($M^1$) (wherein the first metal is selected from an alkali metal, an alkaline-earth metal, and a combination thereof) is added to the partially hydrated mixture, thereby preparing a second mixture (S3).

The precursor of the first metal ($M^1$) may be an alkoxide of the first metal ($M^1$) or an inorganic salt of the first metal ($M^1$). The alkoxide of the first metal ($M^1$) or the salt of the first metal ($M^1$) may be a compound including a cation of the first metal and an anion selected from an alkoxide anion ($OR^-$, wherein R is a C1 to C15 linear or branched alkyl group), a halide anion ($X^-$, wherein X is a halogen), a nitrate anion ($NO_3^-$), a carbonate anion ($CO_3^{-2}$), a sulfate anion ($SO_4^{-2}$), a sulfonate anion ($So_3^-$), a phosphate anion ($PO_4^{-3}$), and an acetate anion ($CH_3COO^-$).

Water is added to the second mixture to induce hydrolysis and prepare a wet gel (S4). Herein, the water added to the second mixture hydrates the precursor of the first metal ($M^1$). The hydrated precursor of the second metal ($M^2$) and the precursor of the first metal ($M^1$) are condensation-polymerized, thereby preparing a wet gel including a condensation polymerization polymer in which $M^1$ and $M^2$ are linked together through oxygen (O), for example, —O—$M^1$—O—$M^2$—O—, —O—$M^1$—O—$M^1$—O—, —O—$M^2$—O—$M^2$—O—, and the like.

The wet gel is calcined to provide a composite metal oxide having mesopores inside or on the surface thereof (S5).

The calcining may be performed at a temperature of about 400° C. to about 800° C., specifically about 400° C. to about 750° C., and more specifically about 450° C. to about 600° C. The calcining may be performed under an air atmosphere or an oxygen atmosphere. The calcining has no particular limit with regard to length of time, but may be performed for about 1 hour to about 48 hours. When the calcining is performed within the above range, a composite metal oxide may have a desired adsorption performance.

The calcining prepares a composite oxide from a wet gel including a condensation polymerization polymer in which $M^1$ and $M^2$ are linked together through oxygen (O).

Before the calcining, aging and drying may be additionally performed. The aging may be performed by allowing a reactant to stand at room temperature (about 24° C) for greater than or equal to about 7 days. The drying may be performed at a temperature ranging from about 50 to about 120° C. for about 48 hours.

The adsorbent for carbon dioxide has increased thermal stability, mechanical stability, and chemical stability, and thus has improved adsorption performance at a middle temperature and a higher temperature as well as at a lower temperature. In other words, the adsorbent for carbon dioxide may adsorb carbon dioxide at a temperature ranging from about 200 to about 500° C. or higher than about 500° C., for example, greater than or equal to about 600° C. The adsorbent for carbon dioxide having higher carbon dioxide adsorption performance may be used to adsorb carbon dioxide generated before combustion as well as during combustion.

A capture module for carbon dioxide may include the adsorbent for carbon dioxide. The adsorbent for carbon dioxide may be filled in a column and the like, but has no particular limit. Hereinafter, the present disclosure is illustrated in more detail with reference to some examples. However, it should be understood that the following are merely example embodiments, and the present disclosure is not to be limited thereto.

EXAMPLE

Examples 1 to 5

Preparation of Adsorbent for carbon dioxide 7 g of aluminum sec-butoxide (Sigma-Aldrich Co. Ltd.) as a precursor of a second metal ($M^2$) is added to 60 ml of ethanol, thereby preparing a first mixture. The first mixture is maintained at 80° C., and 40 ml of ethanol, 0.1 ml of nitric acid, and 0.3 ml of water are added thereto to partially hydrate the first mixture, thereby obtaining sol. The sol is cooled down to 60° C., and magnesium acetate tetrahydrate as a precursor of a first metal ($M^1$) dispersed in 10 ml of ethanol is added thereto, thereby preparing a second mixture in a sol state. Table 1 provides the amount of the magnesium acetate tetrahydrate used in Examples 1 to 5. Then, 5 ml of ethanol and 0.6 ml of water are added to the second mixture to induce a hydration and condensation reaction, thereby obtaining a mixture in a sol state. The mixture is calcinated in a 550° C. electric oven for 5 hours under an air atmosphere, thereby obtaining a composite metal oxide. The composite metal oxide is used as an adsorbent for carbon dioxide.

Example 6

Preparation of Adsorbent for carbon dioxide

An adsorbent for carbon dioxide is prepared according to the same method as Example 5 except for changing the calcining temperature from 550° C. to 600° C.

Example 7

Preparation of Adsorbent for carbon dioxide

An adsorbent for carbon dioxide is prepared according to the same method as Example 5, except for changing the calcining temperature from 550° C. to 650° C.

Example 8

Preparation of Adsorbent for carbon dioxide

An adsorbent for carbon dioxide is prepared according to the same method as Example 5, except for using lithium acetate dihydrate instead of magnesium acetate tetrahydrate as a precursor of the first metal ($M^1$) and changing the calcining temperature from 550° C. to 600° C.

Example 9

Preparation of Adsorbent for carbon dioxide

An adsorbent for carbon dioxide is prepared according to the same method as Example 5, except for using calcium acetate trihydrate instead of magnesium acetate tetrahydrate as a precursor of the first metal ($M^1$) and changing the calcining temperature from 550° C. to 600° C.

Comparative Example 1

Alumina ($Al_2O_3$) is used as an adsorbent for carbon dioxide.

Comparative Example 2

Hydrotalcite ($Mg_6Al_2(CO_3)(OH)_{16} \cdot 4H_2O$, Sigma-Aldrich Co., Ltd.) having a Mg/Al atomic ratio of 3/1 is used as an adsorbent for carbon dioxide.

Comparative Example 3

Hydrotalcite (Sigma-Aldrich Co., Ltd.) having a Mg/Al atomic ratio of 3/1 is calcinated in a 550° C. electric oven for 5 hours, thereby obtaining a $6MgO$—$Al_2O_3$ composite metal oxide. This composite metal oxide is used as an adsorbent for carbon dioxide.

Comparative Example 4

Magnesium oxide (MgO, Sigma-Aldrich Co., Ltd.) consisting of only Mg as a metal is used as an adsorbent for carbon dioxide.

Figure 2:
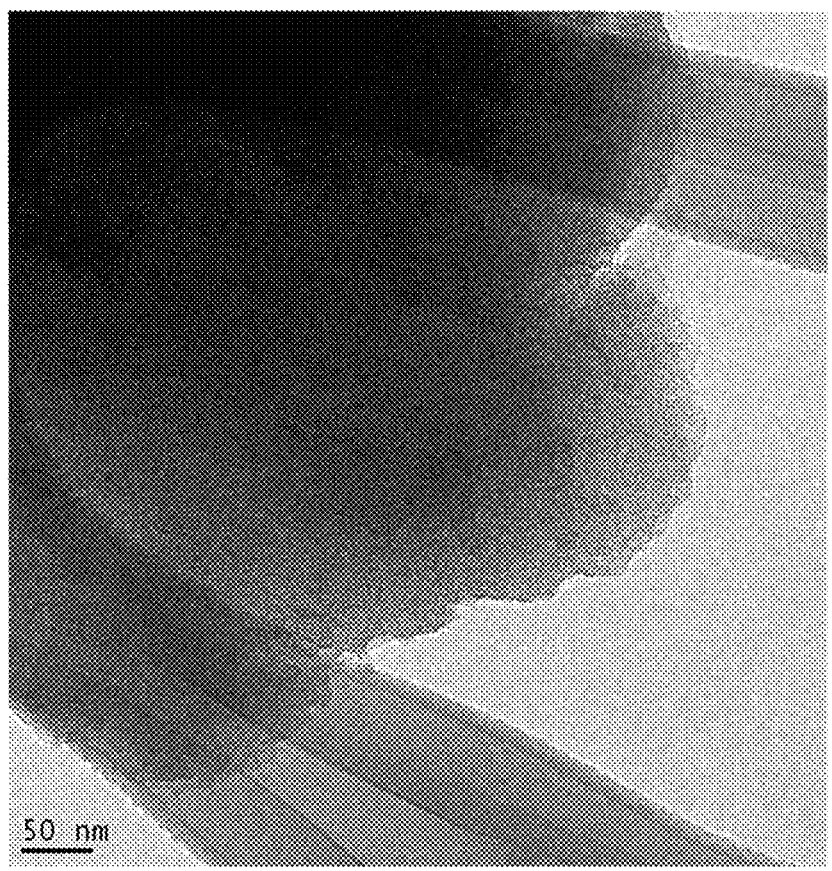
FIGS. 2 to 4 are transmission electron microscope photographs of the composite metal oxides according to Examples 3 and 5 and the alumina according to Comparative Example 1, respectively.
Figure 3:
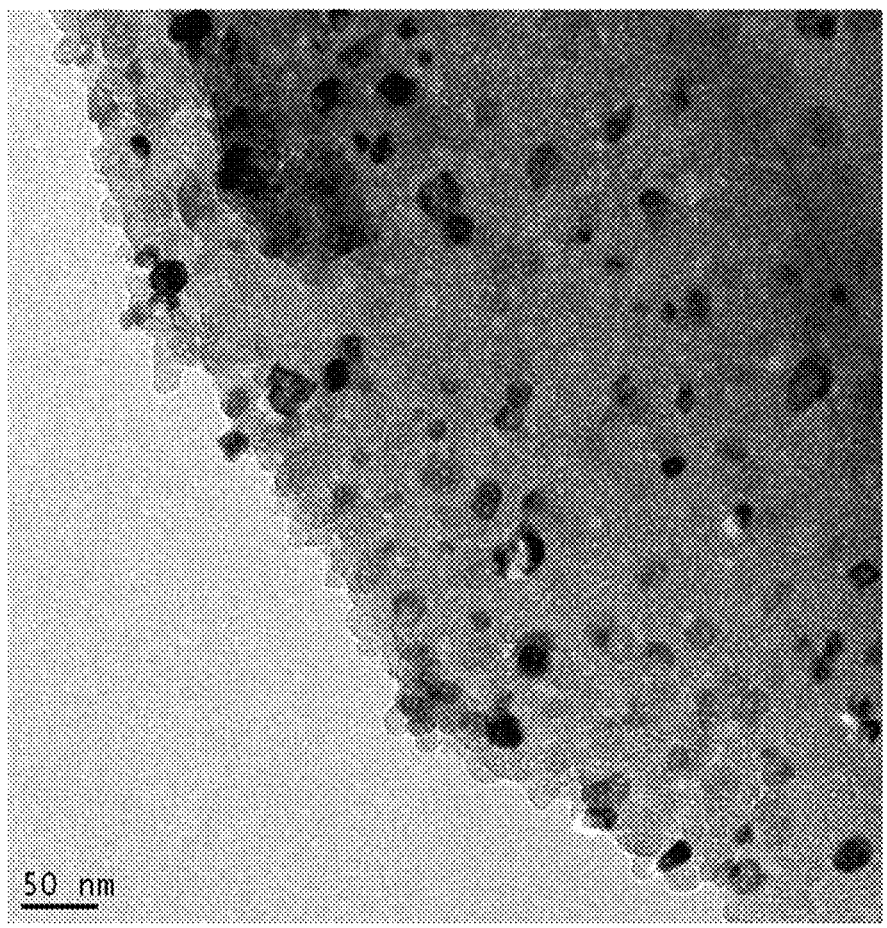
Figure 4:
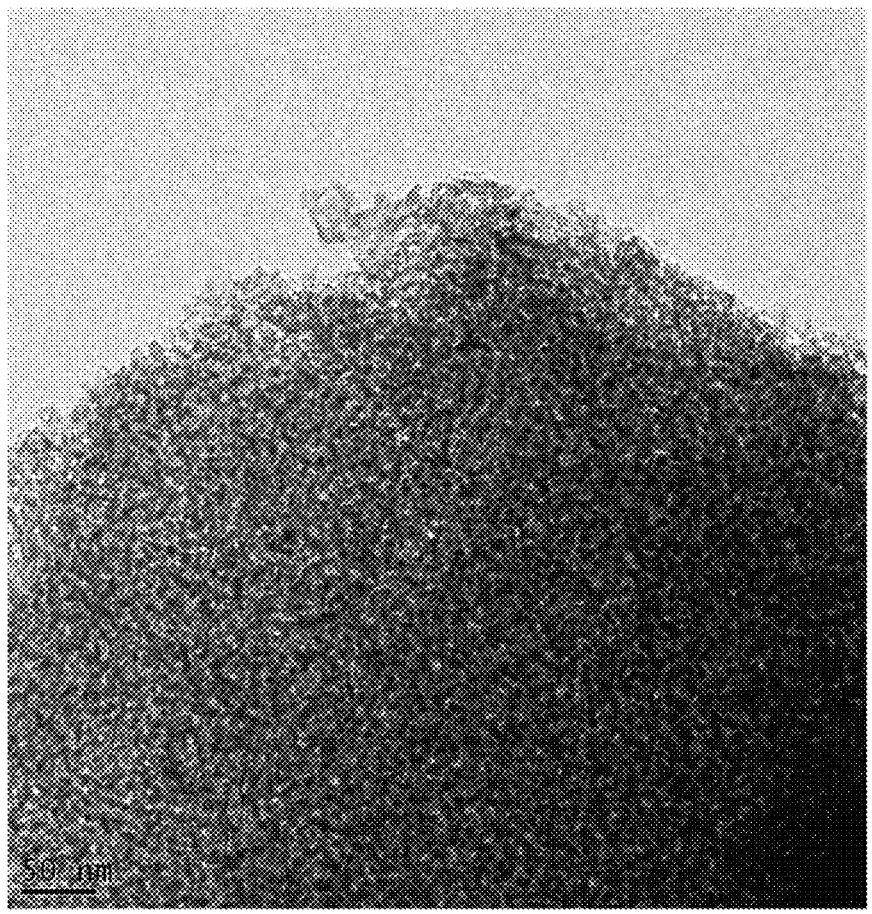

FIGS. 2 and 3 respectively show transmission electron microscope (TEM) photographs of the composite metal oxides according to Examples 3 and 5, respectively. On the other hand, FIG. 4 shows a TEM photograph of the alumina according to Comparative Example 1 for comparison. As shown in FIG. 2, the composite metal oxide of Example 3 has a nanosized pore. As shown in FIG. 3, the composite metal oxide of Example 5 has a nanosized pore and MgO attached to the surface thereof. The nanosized pore in the composite metal oxides according to Examples 3 and 5 has a similar size to that of the alumina according to Comparative Example 1 shown in FIG. 4 but becomes smaller because of the Mg included therein.

The adsorbents for carbon dioxide of Examples 1 to 9 and Comparative Examples 1 to 4 are measured regarding specific surface area, pore volume, and average pore size. The results are provided in the following Table 2. The specific surface area, pore volume, and average pore size are measured according to the Brunauer-Emmett-Teller (BET) theory and its equation in a nitrogen adsorption/desorption experiment.

Figure 5:
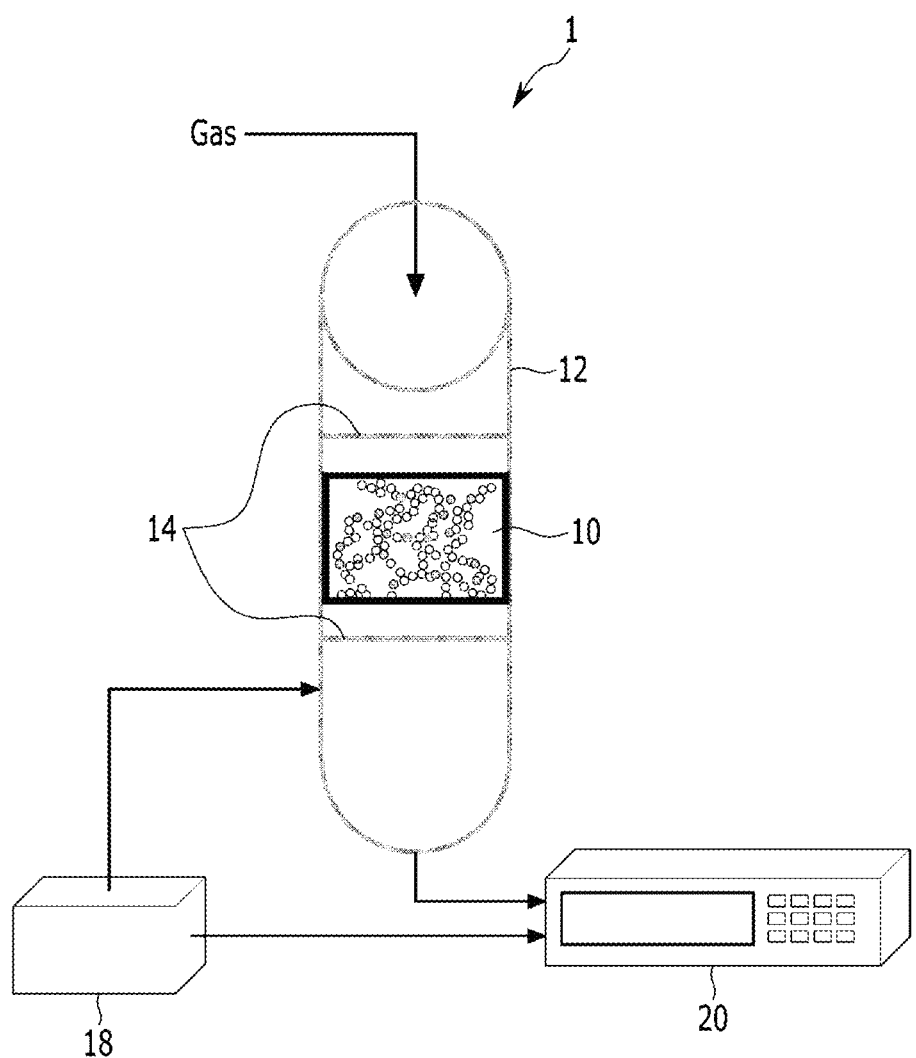
FIG. 5 is a schematic view of an equipment for measuring adsorption performance for carbon dioxide.

The adsorbents for carbon dioxide according to Examples 1 to 9 and Comparative Examples 1 to 4 are evaluated regarding carbon dioxide adsorption performance, wherein 0.25 g of each adsorbent for carbon dioxide 10 according to Examples 1 to 9 and Comparative Examples 1 to 4 is charged in a column 14 on an adsorption bed in a furnace 12 of equipment 1 for measuring carbon dioxide adsorption performance as shown in FIG. 5. Next, a mixed gas including 10 vol % of $CO_2$ and 90 vol % of $N_2$ is passed through the equipment. The adsorption performance evaluation is performed at 200° C. and a normal pressure (1 bar), and the mixed gas is passed at a speed of 200 mL/min. On the other hand, a separate control device 18 is mounted to control speed and pressure for passing a mixed gas during the adsorption performance evaluation. In addition, a gas analyzer 20 is used to measure concentration of discharged carbon dioxide and thus, evaluate adsorption performance. Table 2 shows the adsorption performance of the adsorbents for carbon dioxide according to Examples 3 to 7 and 9 and Comparative Examples 1 to 4.

TABLE 1

| | Precursor of the second metal ($M^2$) (use amount) | Precursor the first metal ($M^1$) (v) | Composite metal oxide | $M^1/M^2$ atomic ratio |
|---|---|---|---|---|
| Example 1 | aluminum sec-butoxide (7 g) | magnesium acetate tetrahydrate (0.97 g) | $MgAl_2O_4$—$4.67Al_2O_3$ | Mg/Al 0.13/1 |
| Example 2 | aluminum sec-butoxide (7 g) | magnesium acetate tetrahydrate (1.45 g) | $MgAl_2O_4$—$2.55Al_2O_3$ | Mg/Al 0.25/1 |
| Example 3 | aluminum sec-butoxide (7 g) | magnesium acetate tetrahydrate (2.90 g) | $MgAl_2O_4$ | Mg/Al 0.5/1 |
| Example 4 | aluminum sec-butoxide (7 g) | magnesium acetate tetrahydrate (11.88 g) | $MgAl_2O_4$—$2.44MgO$ | Mg/Al 1.72/1 |
| Example 5 | aluminum sec-butoxide (7 g) | magnesium acetate tetrahydrate (17.82 g) | $MgAl_2O_4$—$4.16MgO$ | Mg/Al 2.58/1 |
| Example 6 | aluminum sec-butoxide (7 g) | magnesium acetate tetrahydrate (17.82 g) | $MgAl_2O_4$—$4.16MgO$ | Mg/Al 2.58/1 |
| Example 7 | aluminum sec-butoxide (7 g) | magnesium acetate tetrahydrate, 17.82 g | $MgAl_2O_4$—$4.16MgO$ | Mg/Al 2.58/1 |
| Example 8 | aluminum sec-butoxide (7 g) | lithium acetate dihydrate (8.49 g) | $Li_2Al_2O_4$—$2Li_2O$ | Li/Al 3.0/1 |
| Example 9 | aluminum sec-butoxide (7 g) | calcium acetate trihydrate (11.31 g) | $Ca_2Al_2O_4$—$2Ca_2O$ | Ca/Al 3.0/1 |

TABLE 2

|  | Specific surface area (m$^2$/g) | Pore volume (cm$^3$/g) | Average pore size (nm) | CO$_2$ adsorption performance per 1 g of adsorbent | BT 90% CO$_2$ adsorption performance per 1 g of adsorbent |
|---|---|---|---|---|---|
| Example 3 | 191 | 0.1 | 2.2 | 5.52 wt % (1.255 mmol) | 2.57 wt % (0.584 mmol) |
| Example 4 | 113 | 0.11 | 4.4 | 9.92 wt % (2.255 mmol) | 7.14 wt % (1.623 mmol) |
| Example 5 | 66 | 0.11 | 4.8 | 10.03 wt % (2.280 mmol) | 7.15 wt % (1.625 mmol) |
| Example 6 | 89 | 0.25 | 5.4 | 14.46 wt % (3.286 mmol) | 11.83 wt % (2.689 mmol) |
| Example 7 | 59 | 0.15 | 6.4 | 5.91 wt % (1.343 mmol) | 4.42 wt % (1.005 mmol) |
| Example 9 | 102 | 0.32 | 5.8 | 10.75 wt % (2.443 mmol) | 5.68 wt % (1.291 mmol) |
| Comparative Example 1 | 250 | 0.56 | 6.3 | 0.92 wt % (0.209 mmol) | 0.28 wt % (0.064 mmol) |
| Comparative Example 2 | 8 | 0.03 | 17.1 | 4.99 wt % (1.134 mmol) | 2.67 wt % (0.607 mmol) |
| Comparative Example 3 | 199 | 0.17 | 4.1 | 3.43 wt % (0.780 mmol) | 2.28 wt % (0.518 mmol) |
| Comparative Example 4 | 10 | 0.01 | 5.5 | 5.04 wt % (1.145 mmol) | 2.72 wt % (0.618 mmol) |

0.25 g of each adsorbent for carbon dioxide according to Examples 1 to 9 and Comparative Examples 1 to 4 is filled in an 80 cm-long quartz column having an interior diameter of 0.5 inch (1.27 cm), and a mixed gas of 10 vol % of CO$_2$/90 vol % of H$_2$ or 40 vol % of CO$_2$/60 vol % of H$_2$ at a speed of 200 ml/min at 200° C. or 400° C. at 1 bar. The adsorbents for carbon dioxide according to Example 5 and Comparative Example 3 and 4 are measured regarding adsorption performance (capture capacity), and the results are provided in the following Table 3. The adsorbent for carbon dioxide prepared by passing a mixed gas of 10 vol % of CO$_2$/90 vol % of N$_2$ according to Example 5 and Comparative Examples 3 and 4 are measured regarding adsorption performance, and the results are provided in Table 3.

In Table 3, BT (breakthrough) indicates the amount of CO$_2$ adsorbed in 1 g of the adsorbent when 90 vol % of the entire CO$_2$ is adsorbed.

As shown in Table 3, the adsorbent for carbon dioxide according to Example 5 has improved carbon dioxide adsorption performance compared with the adsorbents for carbon dioxide according to Comparative Examples 3 and 4 under all conditions of 10 vol % of CO$_2$/90 vol % of N$_2$ at 200° C., 10 vol % of CO$_2$/90 vol % of H$_2$ at 200° C., and 40 vol % of CO$_2$/60 vol % of H$_2$ at 400° C.

The adsorbents according to Example 5 and Comparative Examples 3 and 4 have adsorption selectivity (capture selectivity) of carbon dioxide and hydrogen, and the results are provided in the following Table 4. Table 4 also shows adsorption performance results of the adsorbents for carbon dioxide

TABLE 3

| Mixed gas (adsorption temperature) | Adsorption performance | Example 5 | Comparative Example 3 | Comparative Example 4 |
|---|---|---|---|---|
| 10 vol % CO$_2$/90 vol % N$_2$ (200° C.) | CO$_2$ adsorption performance per 1 g of adsorbent | 10.03 wt % (2.280 mmol) | 3.43 wt % (0.780 mmol) | 5.04 wt % (1.145 mmol) |
|  | BT 90 vol % CO$_2$ adsorption performance per 1 g of adsorbent | 7.15 wt % (1.625 mmol) | 2.28 wt % (0.518 mmol) | 2.72 wt % (0.618 mmol) |
| 10 vol % CO$_2$/90 vol % H$_2$ (200° C.) | CO$_2$ adsorption performance per 1 g of adsorbent | 9.04 wt % (2.055 mmol) | 1.57 wt % (0.357 mmol) | 4.85 wt % (1.102 mmol) |
|  | BT 90 vol % CO$_2$ adsorption performance per 1 g of adsorbent | 6.89 wt % (1.566 mmol) | 1.36 wt % (0.309 mmol) | 2.64 wt % (0.600 mmol) |
| 40 vol % CO$_2$/60 vol % H$_2$ (400° C.) | CO$_2$ adsorption performance per 1 g of adsorbent | 41.78 wt % (9.459 mmol) | 2.34 wt % (0.534 mmol) | 22.58 wt % (5.132 mmol) |
|  | BT 90 vol % CO$_2$ adsorption performance per 1 g of adsorbent | 27.54 wt % (6.259 mmol) | 0.84 wt % (0.191 mmol) | 11.12 wt % (2.527 mmol) | according to Example 5 and Comparative Examples 3 and 4 under a mixed gas of 40 vol % of $CO_2$/60 vol % of $H_2$.

TABLE 4

| Mixed gas (adsorption temperature) | Adsorption performance | Example 5 | Comparative Example 3 | Comparative Example 4 |
|---|---|---|---|---|
| 40 vol % $CO_2$/60 vol % $H_2$ (400° C.) | $CO_2$ adsorption performance per 1 g of adsorbent | 41.78 wt % (9.459 mmol) | 2.34 wt % (0.534 mmol) | 22.58 wt % (5.132 mmol) |
| | BT 90% $CO_2$ adsorption performance per 1 g of adsorbent | 27.54 wt % (6.259 mmol) | 0.84 wt % (0.191 mmol) | 11.12 wt % (2.527 mmol) |
| | $H_2$ adsorption performance per 1 g of adsorbent | 2.34 wt % (11.700 mmol) | 0.13 wt % (0.650 mmol) | 2.05 wt % (10.250 mmol) |
| | BT 90% $H_2$ adsorption performance per 1 g of adsorbent | 0.84 wt % (4.200 mmol) | 0.08 wt % (0.400 mmol) | 0.65 wt % (3.250 mmol) |

In Table 4, BT (breakthrough) indicates the amount of $CO_2$ adsorbed in 1 g of the adsorbent when 90 vol % of the entire $CO_2$ is adsorbed.

As shown in Table 4, the adsorbent for carbon dioxide according to Example 5 has better carbon dioxide adsorption selectivity than the ones according to Comparative Examples 3 and 4.

While example embodiments have been disclosed herein, it should be understood that other variations may be possible. Such variations are not to be regarded as a departure from the spirit and scope of example embodiments of the present application, and all such modifications as would be obvious to one skilled in the art are intended to be included within the scope of the following claims.

What is claimed is:

1. An adsorbent for carbon dioxide, comprising:
a composite metal oxide including a first metal ($M^1$) and a second metal ($M^2$) linked together by oxygen (O), the first metal ($M^1$) selected from at least one of an alkali metal and an alkaline-earth metal, the second metal ($M^2$) having a trivalent oxidation number or greater, and the composite metal oxide being mesoporous, the first metal ($M^1$) and the second metal ($M^2$) being present at an atomic ratio ($M^1/M^2$) of about 1/1 to about 3/1,
wherein the composite metal oxide has a spinel structure, and wherein the composite metal oxide is a calcined wet gel.

2. The adsorbent for carbon dioxide of claim 1, wherein the composite metal oxide is a crystalline oxide.

3. The adsorbent for carbon dioxide of claim 1, wherein the composite metal oxide includes mesopores having an average pore size of about 2 nm to about 50 nm.

4. The adsorbent for carbon dioxide of claim 1, wherein the composite metal oxide is in a form of a plurality of particles having an average particle size of about 0.01 μm to about 10 μm.

5. The adsorbent for carbon dioxide of claim 1, wherein the composite metal oxide is represented by the following Chemical Formula 1, $$a(M^1_xM^2_yO_z)-b(M^2_pO_q)-c(M^1_rO_s) \quad \text{[Chemical Formula 1]}$$

wherein 0<x≤1, 0<y≤2, 0<z≤4, 0<p≤2, 0<q≤3, 0<r≤2, 0<s≤1, 0<a≤1, 0≤b≤199, 0<c≤9, and 0<a+b+c.

6. The adsorbent for carbon dioxide of claim 1, wherein the alkali metal is selected from at least one of lithium (Li), sodium (Na), potassium (K), rubidium (Rb), and cesium (Cs), and the alkaline-earth metal is selected from at least one of beryllium (Be), magnesium (Mg), calcium (Ca), strontium (Sr), and barium (Ba).

7. The adsorbent for carbon dioxide of claim 1, wherein the second metal ($M^2$) is selected from at least one of a Group 13 element, a Group 14 element, and a transition element.

8. The adsorbent for carbon dioxide of claim 1, wherein the second metal ($M^2$) is selected from at least one of aluminum (Al), silicon (Si), titanium (Ti), and zirconium (Zr).

9. The adsorbent for carbon dioxide of claim 1, further comprising:
an oxide of at least one of the alkali metal and the alkaline-earth metal on the surface of the composite metal oxide.

10. The adsorbent for carbon dioxide of claim 1, wherein the composite metal oxide is selected from at least one of a silicate, an aluminate, a titanate, and a zirconate, the second metal ($M^2$) is selected from at least one of Si, Al, Ti, and Zr, and the second metal ($M^2$) is partially substituted with the first metal ($M^1$).

11. The adsorbent for carbon dioxide of claim 1, wherein the composite metal oxide has a pore volume of about 0.01 to about 3.0 $cm^3/g$.

12. The adsorbent for carbon dioxide of claim 1, wherein the composite metal oxide has a specific surface area of about 10 to about 500 $m^2/g$.

13. A module for capturing carbon dioxide, comprising:
the adsorbent for carbon dioxide according to claim 1.

14. A method of capturing carbon dioxide, comprising:
adsorbing carbon dioxide using the adsorbent for carbon dioxide according to claim 1.

15. The method of claim 14, wherein the adsorbing carbon dioxide is performed at an adsorbing temperature that includes at least one of a middle temperature ranging from 200° C. to 500° C. and at a higher temperature of more than 500° C.

16. A method of preparing an adsorbent for carbon dioxide, comprising:
preparing a first mixture by adding a precursor of a second metal ($M^2$) to a polar solvent, the second metal ($M^2$) having a trivalent oxidation number or greater,
adding water to the first mixture to prepare a partially-hydrated mixture, preparing a second mixture by adding a precursor of a first metal ($M^1$) to the partially-hydrated mixture, the first metal ($M^1$) selected from at least one of an alkali metal and an alkaline-earth metal, adding water to the second mixture to induce hydrolysis and produce a wet gel, and calcining the wet gel to provide a composite metal oxide, the composite metal oxide being mesoporous and having a spinel structure, the composite metal oxide including the first metal ($M^1$) and the second metal ($M^2$) linked together by oxygen (O), the first metal ($M^1$) and the second metal ($M^2$) being present at an atomic ratio ($M^1/M^2$) of about 1/1 to about 3/1.

17. The method of claim 16, further comprising:

adding an acid or alkylene oxide to the first mixture to promote partial hydration of the first mixture.

18. The method of claim 16, wherein the preparing a first mixture includes the precursor of the second metal being an alkoxide or an inorganic salt of the second metal.

19. The method of claim 16, wherein the preparing a first mixture includes the precursor of the second metal being represented by the following Chemical Formula 2, $$M^2(R^1)_m(R^2)_{n-m} \quad \text{[Chemical Formula 2]}$$

wherein $R^1$ and $R^2$ are the same or different and are each independently hydrogen, an acryloyl group, a methacryloyl group, a vinyl group, a C1 to C15 linear or branched alkoxy group, a halogen, or a nitrate group, provided that at least one of $R^1$ and $R^2$ is the C1 to C15 linear or branched alkoxy group, the halogen, or the nitrate group, n denotes a valence of $M^2$, and m is an integer in a range of about 0 to n.

20. The method of claim 16, wherein the preparing a first mixture includes the polar solvent being selected from at least one of water, alcohol, and ether.

21. The method of claim 16, wherein the preparing a second mixture includes the precursor of the first metal ($M^1$) being an alkoxide or a salt of the first metal ($M^1$).

22. The method of claim 16, wherein the preparing a second mixture includes the precursor of the first metal ($M^1$) including a cation of the first metal and an anion selected from an alkoxide anion ($OR^-$, wherein R is a linear or branched C1 to C15 alkyl group), a halide anion ($X^-$, wherein X is a halogen), a nitrate anion ($NO_3^-$), a carbonate anion ($CO_3^{2-}$), a sulfate anion ($SO_4^{2-}$), a sulfonate anion ($SO_3^-$), a phosphate anion ($PO_4^{3-}$), and an acetate anion ($CH_3COO^-$).

23. The method of claim 16, wherein the calcining is performed at a temperature ranging from 400° C. to 800° C.

* * * * *